3,155,654
SUBSTITUTED 3,4-DIHYDRO-1,2,4-BENZOTHIADI-
AZINE-1,1-DIOXIDES
Margaret H. Sherlock, Bloomfield, N.J., assignor to
Schering Corporation, Bloomfield, N.J., a corporation
of New Jersey
No Drawing. Filed Nov. 15, 1960, Ser. No. 69,283
8 Claims. (Cl. 260—243)

This invention relates to novel dihydrobenzothiadiazine compounds and processes for their preparation. More particularly, the invention is concerned with the discovery of a class of nitrofuryl substituted 3,4-dihydro-1,2,4-benzothiadiazine,1,1-dioxides having beneficial bacteriostatic properties and particularly utility in the field of veterinary medicine.

It would be of distinct advantage to the medical profession to have available an anti-bacterial agent capable of being topically or orally administered to clear up infections caused by various bacterial flora. By virtue of the present invention, such a compound is now available.

Accordingly, it is the basis of the present invention that by the unique methods of preparation disclosed herein, a class of enumerated substituents may be introduced into the 3,4-dihydro-1,2,4-benzothiadiazine-1,1-dioxide nucleus and a group of derivative compounds prepared which exhibit strong antibacterial activity. The compounds involved are characterized by the presence in the 3,4-dihydro-1,2,4-benzothiadiazine-1,1-dioxide nucleus of a 5-nitro-2-furyl function at the 3-position and concurrent substitution of a selected class of substituents, such as hydrogen, lower alkyl, halogen, trifluoromethyl, nitro, amino, lower alkoxy, carboxy and lower alkanoylamino at either the 5, 6, 7 or 8 positions on the nucleus. A representative compound of the group exemplified by the present invention is 6-acetylamino-3-(5-nitro-2-furyl)-3,4-dihydro-1,2,4-benzothiadiazine - 1,1-dioxide. This compound is an excellent bacteriostatic agent and is non-toxic at the dosage levels conventionally employed for such agents.

In accordance with the present invention, therefore, the preparation of 3-(5-nitro-2-furyl)-3,4-dihydro-1,2,4-benzothiadiazine-1,1-dioxides optimally having substitution about at least one carbon atom on the benzene portion of the nucleus has been accomplished. The method of preparation of the new structures involves condensation and ring closure between an orthoamino substituted benzenesulfonamide and a nitrated furfural accompanied by heating the reactants in the presence of an inert solvent for periods ranging up to 30 hours preferably at the reflux temperature of the solvent. It is a feature of the general reaction to employ variously substituted sulfonamides which will result in the attainment of a variously substituted 3,4-dihydro-1,2,4-benzothiadiazine moiety of the final compounds obtained. By means of this reaction it has been possible to thus obtain compounds having substitution at the 4,5,6,7 and 8 positions in the 3,4-dihydro-1,2,4-benzothiadiazine-1,1-dioxide nucleus as well as the substitution of the 5-nitro-2-furyl group at the 3-position therein. Of course, the methods of preparation disclosed herein must be considered to also embrace the formation of pharmaceutically acceptable alkali metal salts of the various 3-(5-nitro-2-furyl)-3,4-didhydro-1,2,4-benzothiadiazine-1,1-dioxides by reaction of the compounds with various bases in manners well known to the art.

As a general rule the reaction as indicated by the processes illustrated in the examples set forth herein is carried out at temperatures above room temperature, the particular temperature in a given instance of course varying with the solvent, reactants and reflux conditions involved. For instance, when carried out in the presence of an inert organic solvent the temperature is maintained at about reflux temperature of the solvent which generally ranges from 50 to 150° C. The reaction is generally carried to completion with the proportions of the reactants being in substantially equimolar quantities.

The aforedescribed reaction basically involves a condensation between the aldehyde 5-nitro furfural with the class of substituted sulfonamides possessing a reactive amino group. As a reflux solvent for such reaction, one may utilize alcohols, polyglycol ethers and particularly acetonitrile which is disclosed as the solvent in the following general scheme of the reaction:

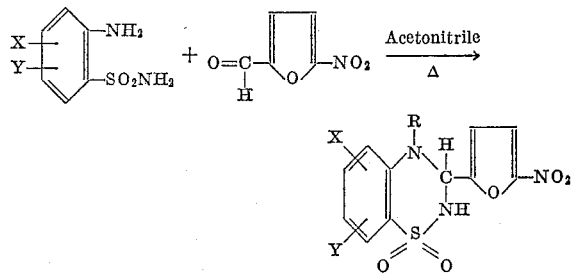

The substituents represented by X and Y above are as indicated below. While this reaction illustrates the preferred method of preparing the instant compounds, it is to be understood that this is merely representative and other methods may of course be employed.

The novel compounds of this invention, therefore, may be represented as having the following formula:

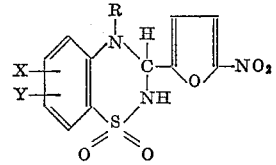

and salts thereof wherein X represents hydrogen, lower alkyl, halogen, amino, lower alkoxy, carboxy, lower alkanoylamino, trifluoromethyl and nitro. Y represents hydrogen, lower alkyl or a halogen and R represents hydrogen, or a lower alkyl radical.

It is a unique and novel feature of the compounds disclosed above that they optimally contain at least one and in some cases more than one substituent on the benzene ring portion of the nucleus in place of hydrogen. In those cases where there is a disubstitution in the benzene ring portion of the nucleus the substituent present as the second function in the benzenoid moiety is most preferably a halogen such as chlorine, bromine and the like.

It is also within the concept of the present invention that an additional methyl group be present on the carbon atom in the 3-position in the benzothiadiazine nucleus. This may be achieved by the alternative use of a ketone instead of the aldehyde,5-nitrofurfural.

The compounds of the present invention may be administered either topically or orally. When administered topically they are preferably formulated as an ointment although they may be employed as a liquid or a powder. As a general statement, when administered as a topical ointment the active ingredient will be present in amounts in the order of 2 mgm. per gram of total product. On the other hand, when adminstered orally the active ingredient would be in tablet or capsule form administered with various extenders. An effective dosage for the 6-acetylamino-3-(5-nitro - 2 - furyl) - 3,4 - dihydro-1,2,4-benzothiadiazine-1,1-dioxide is 1–4 mgm. per pound of body weight.

An illustrative ointment formula indicating the use of the compounds as an antibacterial agent is the following:

| Ingredient: | Parts by weight |
|---|---|
| 6-acetyl amino-3-(5-nitro - 2 - furyl)-3,4-dihydro-1,2,4-benzothiadiazine-1,1-dioxide | 2.0 |
| Antioxidant | 1.0 |
| Carbowax 400 | 598.0 |
| Carbowax 4000 | 399.0 |

Various extenders such as water, lactose, starches, magnesium stearate, vegetable oil, calcium carbonate, talc and various water soluble gums such as Carbowax may be advantageously employed in formulating the active substance for particular application. When Carbowax is employed in formulating an ointment, it should contain a suitable antioxidant material as illustrated in the formula set forth above.

It is a unique and peculiar feature of the 6-chloro-3-(5-nitro-2-furyl)-3,4-dihydro - 1,2,4 - benzothiadiazine-1,1-dioxide member of the class of compounds disclosed herein and particularly prepared in the manner set forth in Example II that it has the additional capacity to increase the rate of anabolic growth in mammals in addition to its utility as a bacteriostatic agent. This property appears to be limited to those compounds having a halogen atom in the 6-position of the nucleus preferably chlorine, although other halogens may be employed in the same position with somewhat reduced activity.

The invention will appear more fully from the examples which are set forth to illustrate the invention as follows:

EXAMPLE 1

*3-(5-Nitro-2-Furyl)-3,4-Dihydro-1,2,4-Benzothiadiazine-1,1-Dioxide*

A mixture of 5.1 grams of orthanilamide, 6 grams of 5-nitrofurfural and 100 mls. of acetonitrile is refluxed for 6 hours. The solvent is removed in vacuo and the residual oil is crystallized by trituration with ether. The product of this example is recrystallized from isopropyl acetate-hexane, M.P. 198–198.5° C. (dec.).

EXAMPLE 2

*6-Chloro-3-(5-Nitro-2-Furyl)-3,4-Dihydro-1,2,4-Benzothiadiazine-1,1-Dioxide*

A mixture of 10 grams of 2-amino-4-chlorobenzenesulfonamide, 9.70 grams of 5-nitrofurfural and 100 mls. of acetonitrile is refluxed for 6 hours. The solvent is removed in vacuo and the residue is recrystallized from isopropyl acetate-hexane, M.P. 208° C. (dec.).

EXAMPLE 3

*6-Trifluoromethyl-3-(5-Nitro-2-Furyl)-3,4-Dihydro-1,2,4-Benzothiadiazine-1,1-Dioxide*

A mixture of 10 grams of 2-amino-4-trifluoromethylbenzenesulfonamide, 7.7 grams of 5-nitrofurfural and 300 mls. of acetonitrile is refluxed for 20 hours. After removal of the acetonitrile in vacuo, the residue is recrystallized as in Example 1, M.P. 231° C. (dec.).

EXAMPLE 4

*6-Methoxy-3-(5-Nitro-2-Furyl)-3,4-Dihydro-1,2,4-Benzothiadiazine-1,1-Dioxide*

A mixture of 15.2 grams of thiourea, 25.3 grams of benzyl chloride and 124 mls. of ethanol are refluxed for 4 hours. A solution of 37.5 grams of 3-nitro-4-chloroanisole in 100 mls. of ethanol is added thereto followed by the addition of a hot solution of 28.6 grams of potassium hydroxide in 200 mls. of ethanol and the reaction mixture is refluxed for 3½ hours, cooled, filtered and washed with hexane. After recrystallization from benzene-hexane 40 grams of a solid having a M.P. of 108–109° C. is obtained corresponding to a 72% yield of 4-methoxy-2-nitrophenyl-benzyl sulfide which is employed as an intermediate in preparing the final compounds.

Through an ice cooled suspension 15 grams of the product prepared above in 330 mls. of 33% acetic acid, chlorine gas is bubbled for one hour at a controlled temperature range of 0–10° C. under vigorous stirring. The reaction mixture is allowed to stand at room temperature overnight and oxidation continued at 0–10° C. for 4 hours. The liquid remaining is decanted and a waxy solid obtained which is added to 200 mls. of 28% ammonium hydroxide solution with cooling and stirring. After being allowed to stir for 1½ hours excess ammonia is removed in vacuo and the residue is made acidic with concentrated hydrochloric acid. A precipitate of 9.5 grams of a white solid exhibiting a M.P. of 140–142° C. is recrystallized from a methanol-water solvent mixture to produce 2-nitro-4-methoxybenzenesulfonamide.

To a refluxing solution of 8 grams of 2-nitro-4-methoxybenzenesulfonamide and 12 grams of ammonium chloride 76 mls. of methanol and 38 mls. of water is added 12 grams of iron filings with stirring over a period of 1½ hours. The liquid is filtered while hot and diluted with 330 mls. of water. It is then heated to boiling, charcoaled, and cooled. 5 grams of a solid exhibiting a M.P. of 142–144° C. is obtained which is 2-amino-4-methoxybenzenesulfonamide.

A solution of 8.5 grams of the 2-amino-4-methoxybenzene sulfonamide prepared above and 8.4 grams of 5-nitrofurfural in 125 mls. of acetonitrile is refluxed for 18 hours. After recrystallization from ethanol, the 6-methoxy - 3 - (5 - nitro - 2 - furyl) - 3,4 - dihydro - 1,2,4-benzothiadiazine-1,1-dioxide is obtained giving a M.P. of 191–192° C. (dec.).

EXAMPLE 5

*6-Methyl-3-(5-Nitro-2-Furyl)-3,4-Dihydro-1,2,4-Benzothiadiazine-1,1-Dioxide*

15.2 grams of thiourea, 25.3 grams of benzyl chloride and 125 mls. of ethanol are refluxed for 4 hours. 34.3 grams of 4-chloro-3-nitrotoluene in 100 mls. of ethanol are added to the mixture followed by the addition of a hot solution of 28.6 grams of potassium hydroxide in 200 mls. of ethanol. This mixture is refluxed for 3½ hours, cooled, filtered, washed with hexane and recrystallized from benzene-hexane to give 36 grams of a solid having a M.P. of 96–98° C. This substance is the intermediate, 2-nitro-4-methylphenylbenzyl sulfide.

Through a suspension of 14.3 grams of the 2-nitro-4-methylphenylbenzyl sulfide prepared above in 330 mls. of 33% acetic acid, chlorine gas is bubbled under vigorous stirring at 0–10° C. for 1½ hours. The mixture is allowed to stand overnight then oxidation is continued for 4 hours at 0–10° C., a liquid is decanted and the solid is washed with petroleum ether and added to liquid ammonia. The excess ammonia is allowed to evaporate, water is added to the residue and the suspension made acidic with hydrochloric acid. After cooling and filtering, 11 grams of a solid having a M.P. of 120–123° C. is obtained. This is the compound 2-nitro-4-methylbenzenesulfonamide.

10 grams of the 2-nitro-4-methylbenzenesulfonamide prepared above and 16.1 grams of ammonium chloride in 102 mls. of methanol and 51 mls. of water are heated to reflux. 16.1 grams of iron filings are added portion-wise over a period of 1½ hours. The reaction mixture is refluxed further for 12 hours, filtered, diluted with 443 mls. of water, heated to boiling and charcoaled. There is obtained 6.6 grams of a solid upon cooling. This solid has a M.P. of 123–126° C. and is the compound, 2-amino-4-methylbenzenesulfonamide.

5 grams of the intermediate 2-amino-4-methylbenzenesulfonamide, 4.55 grams of 5-nitrofurfural and 125 mls. of acetonitrile is refluxed for 20 hours. After recrystallization from ethanol-hexane there is obtained 6-methyl-3-(5-nitro - 2-furyl)-3,4-dihydro-1,2,4-benzothiadiazine-1,1-dioxide M.P. of 158–160° C. (dec.).

EXAMPLE 6

*6-Acetylamino-3-(5-Nitro-2-furyl)-3,4-Dihydro-1,2,4-Benzothiadiazine-1,1-Dioxide*

To a mixture of 12.5 grams of benzyl mercaptan and 13 grams of sodium carbonate in 40 mls. of water is added a solution of 20.25 grams of 2,4-dinitrochlorobenzene in 50 mls. of hot ethanol. The yellow mixture which results when cooled after refluxing for 4 hours and pouring into 170 mls. of water, forms 24 grams of a yellow solid. After filtration and recrystallization from a benzene-hexane the M.P. exhibited by the solids is 127–128° C. This material is 2,4-dinitrophenylbenzyl sulfide.

14.5 grams of the above, 2,4-dinitrophenylbenzyl sulfide, and 18.4 grams of ammonium chloride is suspended in 155 mls. of methanol and 77 mls. of water and heated to reflux. 3.1 mls. of ammonium hydroxide (29%) is added. Over a period of 1 hour 21.5 grams of sodium sulfide (60% technical flakes) is added and the reflux continued for 1 additional hour. 155 mls. of methanol is added, the mixture heated to reflux during the course of the reaction and at the termination thereof filtered while hot and the filter cake washed with hot methanol.

The filtrate is acidified with glacial acetic acid and concentrated in vacuo to 100 mls. A solid is formed, filtered off, taken up in benzene and dried. To the refluxing benzene solution is added 7 mls. of acetic anhydride. The refluxing operation is continued for ½ hour and the yield of 9 grams of a solid removed. The solid formed exhibits a M.P. of 180–182° C. and is 2-nitro-4-acetylaminophenylbenzyl sulfide.

10 grams of the above intermediate, 2-nitro-4-acetylaminophenylbenzyl sulfide is suspended in 135 mls. of water containing 1.7 grams of ferric chloride. Chlorine gas is bubbled through the stirred suspension for 4 hours at a temperature ranging from 0–10° C. A waxy solid which forms is filtered from the solution, extracted with ether, dried and concentrated. The residue is added dropwise to 100 mls. of liquid ammonia, excess ammonia is allowed to evaporate and the residue suspended in 50 mls. of water. This reaction is made acidic with concentrated hydrochloric acid, cooled, filtered and washed with hexane. 5 grams of a solid exhibiting a M.P. of 248–250° C. is recrystallized from methanol/water. This is the intermediate, 2-nitro-4-acetylaminobenzenesulfonamide.

4 grams of 2-nitro-4-acetylaminobenzenesulfonamide is dissolved in 44 mls. of methanol and 22 mls. of water containing 5.35 grams of ammonium chloride. The reaction mixture is reduced with 5.35 grams of iron filings which is added in small increments during the reflux for 1½ hours. After the iron filings have been added, a further reflux period is allowed. The mixture is filtered while hot and the filtrate diluted with 66 mls. of water, heated to boiling and charcoaled. To the filtrate is added 2 drops of concentrated hydrochloric acid and the clear solution concentrated in vacuo until solids form at which time it is cooled and filtered to yield 2.5 grams of a solid material exhibiting a M.P. of 216° C. This is the intermediate, 2-amino-4-acetylaminobenzenesulfonamide, directly employed to form the substituted benzothiadiazines of the present invention.

6 grams of 2-amino-4-acetylaminobenzenesulfonamide is refluxed with 5.1 grams of 5-nitrofurfural and 200 mls. of acetonitrile for 22 hours. After recrystallization from methanol there is obtained the compound of this example, M.P. of 220° C. (dec.). Hydrolysis of this compound with ethanolic hydrogen chloride affords 6-amino-3-(5-nitro-2-furyl)-3,4-dihydro-1,2,4-benzothiadiazine-1,1-dioxide.

EXAMPLE 7

*7-Nitro-3-(5-Nitro-2-Furyl)-3,4-Dihydro-1,2,4-Benzothiadiazine-1,1-Dioxide*

8 grams of 2-amino-5-nitrobenzenesulfonamide, 6.25 grams of 5-nitrofurfural and 200 mls. of acetonitrile are refluxed for 20 hours. The reaction produces a solid precipitate. After purification of this solid in a manner similar to that disclosed in the preceding examples there is obtained the compound of this example, M.P. of 228–229° C. (dec.).

EXAMPLE 8

*6-Carboxy-3-(5-Nitro-2-Furyl)-3,4-Dihydro-1,2,4-Benzothiadiazine-1,1-Dioxide*

63 grams of benzyl chloride, 38 grams of thiourea and 325 mls. of ethanol containing 5 to 10 drops of concentrated ammonium hydroxide are stirred and refluxed for 4 hours. 100 grams of 3-nitro-4-chlorobenzoic acid is added thereto followed by a solution of 93 grams of potassium hydroxide in 1300 mls. of ethanol. A thick yellow suspension is obtained which is heated for 1 hour on a steam bath and filtered. The crude wet salt which results from the reaction is suspended in hot water and acidified with concentrated hydrochloric acid, filtered again, and washed with water followed by air drying by evaporation. The solid obtained is then recrystallized from ethanol-water to give a solid having a M.P. of 216–218° C. which is identified to be 2-nitro-4-carboxyphenylbenzylsulfide, one of the intermediates useful in the preparation of our final product.

Through a suspension of 15 grams of the 2-nitro-4-carboxyphenylbenzyl sulfide prepared above in 210 mls. of water containing 3 grams of hydrated ferric chloride, chlorine gas is bubbled for 45 minutes keeping the temperature between 0–10° C. The solid obtained is removed by filtration, dissolved in ether, dried, concentrated by evaporation to a small volume and added dropwise to 250 mls. of liquid ammonia. The excess ammonia is permitted to evaporate off and the residue added to water to form a suspension which is acidified with concentrated hydrochloric acid, charcoaled in methanol and water and a few drops of HCl are added to the filtrate. After filtration the yield is 12.5 grams of a solid having a M.P. of 258° C. which is 2-nitro-4-carboxybenzenesulfonamide.

20 grams of the 2-nitro-4-carboxybenzenesulfonamide prepared above in 235 mls. of methanol with 117 mls. of water containing 28 grams of ammonium chloride is reduced with 28 grams of iron filings added slowly over a period of 1½ hours to the refluxing mixture. The mixture is allowed to reflux for an additional 1½ hours and filtered while hot. The filtrate is diluted with 200 mls. of water which has been made slightly basic with ammonium hydroxide and subjected to filtration through charcoal. The filtrate obtained is acidified and filtered to yield 12 grams of a solid, M.P. 263–266° C., which is 2-amino-4-carboxybenzenesulfonamide.

4.4 grams of 2-amino-4-carboxybenzenesulfonamide as prepared above is refluxed with 4.2 grams of 5-nitrofurfural, 100 mls. of acetonitrile solvent and 75 mls. of methanol, for 16 hours. The solvent is removed in vacuo and the residue recrystallized from aqueous methanol. The solid precipitate resulting therefrom is the compound of this example, M.P. of 245–250° C. (dec.).

EXAMPLE 9

*7-Chloro-3-(5-Nitro-2-Furyl)-3,4-Dihydro-1,2,4-Benzothiadiazine-1,1-Dioxide*

5 grams of 2-amino-5-chlorobenzenesulfonamide is refluxed for 28 hours with 4.85 grams of 5-nitrofurfural and 125 mls. of acetonitrile. The solvent is removed and the residue triturated with ether and recrystallized from ethanol-hexane to give the compound of this example, M.P. of 192–193° C. (dec.).

EXAMPLE 10

*6,7-Dichloro-3-(5-Nitro-2-Furyl)-3,4-Dihydro-1,2,4-Benzothiadiazine-1,1-Dioxide*

5.1 grams of 2-amino-4,5-dichlorobenzenesulfonamide, prepared by reacting 3,4-dichloroaniline with chlorosulfonic acid followed by amination of the product formed in any manner well known to the art, is refluxed with 5 grams of 5-nitrofurfural and 125 mls. of acetonitrile for 20 hours. As a result of the reaction a dark orange liquid is obtained which is evaporated to dryness and dissolved in anhydrous ether. After removal of the liquid portion in vacuo the solid is triturated with ether, filtered and washed with ether. Following recrystallization from ethanol-hexane 6.8 grams of the compound of this example are removed. M.P. 211–212° C. (dec.).

EXAMPLE 11

*6-Chloro-7-Methyl-3-(5-Nitro-2-Furyl)-3,4-Dihydro-1,2,4-Benzothiadiazine-1,1-Dioxide*

4.4 grams of 2-amino-4-chloro-5-methylbenzenesulfonamide is refluxed for about 27 hours with 5 grams of 5-nitrofurfural and 100 mls. of acetonitrile. After conventional purification steps a solid powderous material is obtained which constitutes the compound of this example.

EXAMPLE 12

*6-Methyl-7-Chloro-3-(5-Nitro-2-Furyl)-3,4-Dihydro-1,2,4-Benzothiadiazine-1,1-Dioxide*

5 grams of 2-amino-4-methyl-5-chlorobenzenesulfonamide is refluxed for 20 hours with 5 grams of 5-nitrofurfural and 125 mls. of acetonitrile. After recrystallization from an ethanol solvent 4 grams of a solid is obtained which is the compound of this example.

EXAMPLE 13

*4-Methyl-7-Chloro-3-(5-Nitro-2-Furyl)-3,4-Dihydro-1,2,4-Benzothiadiazine-1,1-Dioxide*

A solution of 50 grams of 2,5-dichlorobenzenesulfonamide and 500 mls. of 40% aqueous methylamine is heated for 5 hours in a bomb at 190–200° C. Concentration of the reaction mixture yields a solid which melts at 147–149° C. after recrystallization from benzene-petroleum ether. This is 2-methylamino-5-chlorobenzenesulfonamide. 5.1 grams of the 2-methylamino-5-chlorobenzenesulfonamide is refluxed with 5.3 grams of 5-nitrofurfural and 150 mls. of acetonitrile. The solid recovered after purification by recrystallization from a methanol solvent is the compound of this example.

EXAMPLE 14

*7-Bromo-3-(5-Nitro-2-Furyl)-3,4-Dihydro-1,2,4-Benzothiadiazine-1,1-Dioxide*

5.2 grams of 2-amino-5-bromobenzenesulfonamide is refluxed with 5.5 grams of 5-nitrofurfural and 150 mls. of acetonitrile to produce a quantity of a solid which after trituration and recrystallization from ethyl alcohol is the compound of this example.

EXAMPLE 15

*6-Trifluoromethyl-7-Chloro-3-(5-Nitro-2-Furyl)-3,4-Dihydro-1,2,4-Benzothiadiazine-1,1-Dioxide*

2.74 grams of 2-amino-4-trifluoromethyl-5-chlorobenzenesulfonamide, prepared by the chlorosulfonation of 3-trifluoromethyl-4-chloroaniline followed by amination in any manner well known to the art, is refluxed with 2.8 grams of 5-nitrofurfural and 100 mls. of acetonitrile. The resulting solid is recrystallized from ethanol and is the compound of this example.

EXAMPLE 16

*5-Chloro-3-(5-Nitro-2-Furyl)-3,4-Dihydro-1,2,4-Benzothiadiazine-1,1-Dioxide*

Stoichiometric quantities of 2,6-dichloronitrobenzene, thiourea and benzyl chloride are refluxed to give 3-chloro-2-nitrophenylbenzylsulfide. In a manner similar to that set forth in Example 4, this compound is reacted to form 2-nitro-3-chlorobenzenesulfonamide. This product is converted to the intermediate 2-amino-3-chlorobenzenesulfonamide by treatment in an analogous manner to that disclosed therein. This compound is prepared by refluxing a solution of 10 grams of 2-amino-3-chlorobenzenesulfonamide as prepared above with 9.7 grams of 5-nitrofurfural for 4 hours in the presence of 100 mls. of acetonitrile solvent. The acetonitrile is removed in vacuo and the residual solid recrystallized from isopropyl acetate-hexane yielding the compound of this example.

EXAMPLE 17

*8-Chloro-3-(5-Nitro-2-Furyl)-3,4-Dihydro-1,2,4-Benzothiadiazine-1,1-Dioxide*

Stoichiometric quantities of 2,3-dichloronitrobenzene, thiourea and benzylchloride are refluxed in a manner similar to that described in Example 4 to give 6-chloro-2-nitrophenylbenzylsulfide. This compound is treated to give 2-nitro-6-chlorobenzenesulfonamide by manners well known to the art. This compound is the intermediate which is reduced to give 2-amino-6-chlorobenzenesulfonamide which is employed in the preparation of the final compounds.

This particular compound is prepared by refluxing a reaction mixture of 10 grams of 2-amino-6-chlorobenzenesulfonamide prepared above with 9.8 grams of 5-nitrofurfural and 100 mls. of acetonitrile for about 10 hours. The acetonitrile is removed in vacuo. The residual solid obtained after recrystallization from isopropyl acetate-hexane is the compound of this example.

Although the invention has been described by a series of examples of the manner of preparing the compounds of the invention for a proper definition of the proper scope of the said invention reference should be made only to the appended claims. In those instances wherein starting or intermediary substances are novel per se, their method of manufacture will be obvious to one skilled in the art by applying analogously known methods.

I claim:

1. 3 - (5 - nitro - 2 - furyl) - 3,4 - dihydro - 1,2,4 - benzothiadiazine-1,1-dioxides having hydrogen at the 2-position, having at the 4-position a member selected from the group consisting of H, lower alkyl, and lower alkanoyl, and having at most two substituents present on the benzenoid portion of the molecule said substituents selected from the group consisting of hydrogen, lower alkyl, halogen, trifluoromethyl, amino, nitro, lower alkoxy, carboxy and lower alkanoylamino.

2. 6 - acetylamino - 3 - (5 - nitro - 2 - furyl) - 3,4-dihydro-1,2,4-benzothiadiazine-1,1-dioxide.

3. 6 - chloro - 3 - (5 - nitro - 2 - furyl) - 3,4 - dihydro-1,2,4-benzothiadiazine-1,1-dioxide.

4. 7 - chloro - 3 - (5 - nitro - 2 - furyl) - 3,4 - dihydro-1,2,4-benzothiadiazine-1,1-dioxide.

5. 6,7 - dichloro - 3 - (5 - nitro - 2 - furyl) - 3,4 - dihydro-1,2,4-benzothiadiazine-1,1-dioxide.

6. 4 - methyl - 7 - chloro - 3 - (5 - nitro - 2 - furyl)-3,4-dihydro-1,2,4-benzothiadiazine-1,1-dioxide.

7. 6 - bromo - 3 - (5 - nitro - 2 - furyl) - 3,4 - dihydro-1,2,4-benzothiadiazine-1,1-dioxide.

8. 6 - trifluoromethyl - 7 - chloro - 3 - (5 - nitro - 2-furyl)-3,4-dihydro-1,2,4-benzothiadiazine-1,1-dioxide.

(References on following page)

References Cited in the file of this patent

UNITED STATES PATENTS

| | | |
|---|---|---|
| 2,358,465 | McNally et al. | Sept. 19, 1944 |
| 2,388,529 | D'Alelio et al. | Nov. 6, 1945 |
| 2,726,264 | Gregory | Dec. 6, 1955 |
| 2,809,194 | Novello | Oct. 8, 1957 |
| 2,886,566 | Novello | May 12, 1959 |
| 2,986,573 | Topliss et al. | May 10, 1961 |
| 3,024,233 | Sherman | Mar. 6, 1962 |

OTHER REFERENCES

Novello et al.: Jour. Org. Chem., pages 970–980 (June 1960).